United States Patent Office 3,429,021
Patented Feb. 25, 1969

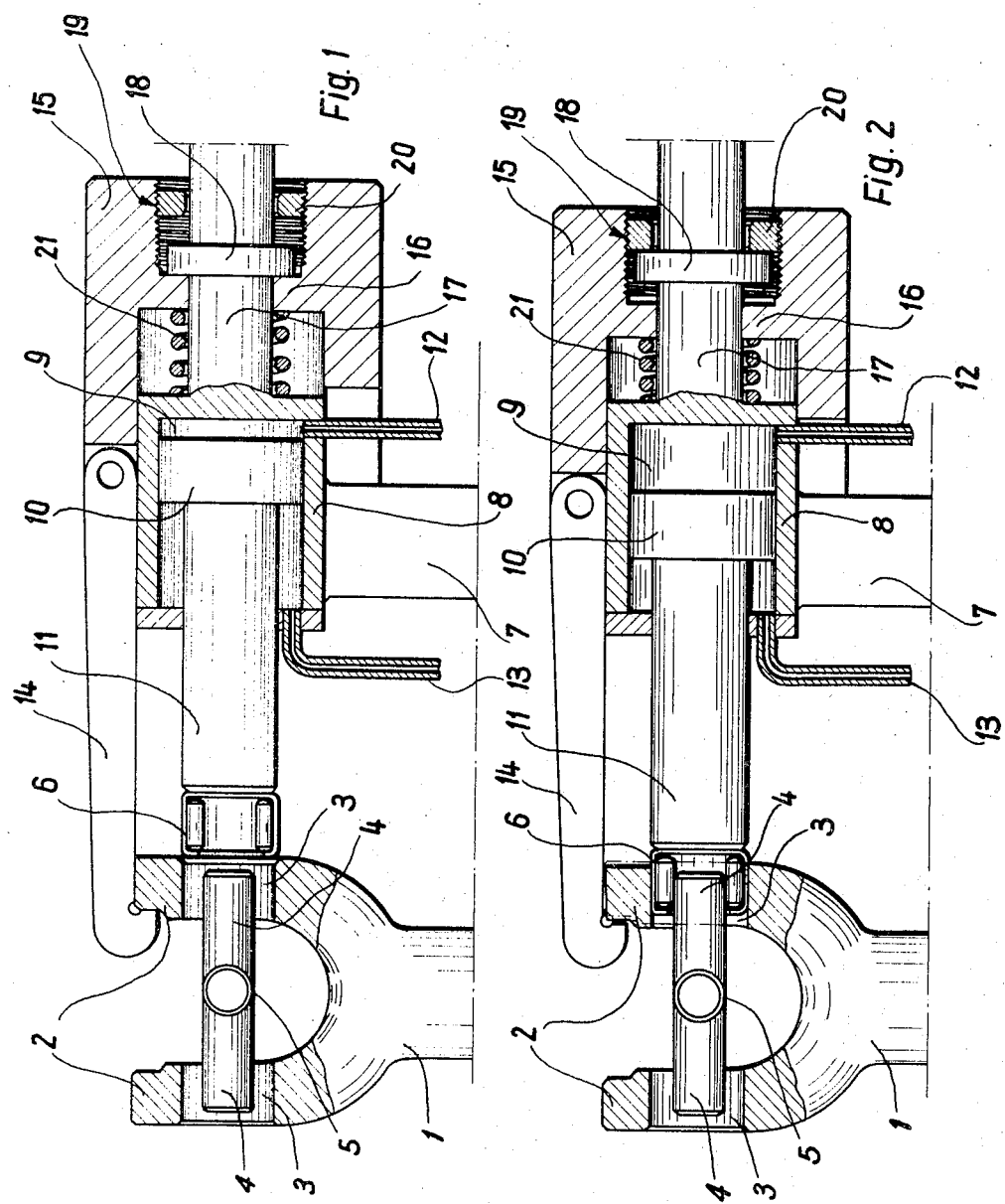

3,429,021
METHOD AND APPARATUS FOR ASSEMBLING UNIVERSAL JOINTS
Karl Spiess, Herzogenaurach, Germany, assignor to Industriewerke Schaeffler OHG, Herzogenaurach, Germany, a corporation of Germany
Filed Nov. 16, 1966, Ser. No. 594,920
Claims priority, application Germany, Dec. 10, 1965, J 29,651
U.S. Cl. 29—148.4      4 Claims
Int. Cl. B23p 19/02

ABSTRACT OF THE DISCLOSURE

A method and apparatus for assembling universal joints formed by the connection of two shafts forked at their ends with a universal joint spider and having radially and axially loadable bearings arranged in bores in the shaft forks for accommodating the spider trunnions in which the reaction force resulting from the pressing-in of the bearings into the fork arm bores is supported by holding clips on the fork arms.

Prior art

Universal joints serve to establish an angular motion connection between two force-transmitting shafts. Universal joints are in great demand in large quantities for various uses, particularly in the automotive industry. Therefore, every effort is being made to mechanize as much as possible the assembly operations of these universal joints. With this purpose in view, a method has already been suggested to press-in the bearings which accommodate the spider trunnions in the bores of the fork arms with rams co-ordinated with each individual bearing and to accommodate the reaction force resulting from the pressing-in operation, the fork arms are connected by means of holding clips on the device producing the pressing-in force, so that no external forces will act on the fork arms. However, when the bearing is pressed in until it abuts in a play-free manner against the spider trunnion, the pressing-in force also acts on the spider trunnion, which in turn develops an external force, which acts on the bearing from the spider trunnion and acts oppositely to the pressing-in force. This external force represents to a certain extent the reaction force to the pressing-in force. However, as the holding clips are still in engagement with the fork arm, the equilibrium of the forces is interfered with. The force acting on the fork arm through the holding clips produces an action by which the fork arm is pressed away from the center of the universal joint. This occurs with particular intensity when the fork arms are especially thin-walled and slender. If the bearings are secured in the bore directly after being pressed-in and in play-free abutment against the spider trunnion, a pre-load between the bearing and the spider trunnion will result when the holding clips are removed and the fork arms spring back. In some methods of assembling, such a pre-load is undesired as in those cases where a zero-play (measured in an axial bore direction) or a free play between the spider trunnion and the bearing is desired.

Objects of the invention

It is an object of the invention to provide a novel method of assembling universal joints with free play or zero play between the pressed-in bearings and the spider trunnions.

It is another object of the invention to provide a novel apparatus for assembling universal joints with free play or zero play between the pressed-in bearings and the spider trunnions.

These and other objects and advantages of the invention will become obvious from the following detailed description.

The invention

The novel method of the invention of assemblying universal joints formed by the connection of two shafts forked at their ends with a universal joint spider and having radially and axially loadable bearings for accommodating the spider trunnions in bores in the shaft forks comprises centering the spider and the shaft forks relative to one another and pressing bearings into the bores of the fork arms while supporting the reaction force resulting from the pressing-in force at the fork arms, the said fork arms and reaction force support elastically giving way a predetermined distance in the pressing-in direction, whereby the fork arms spring back the same distance after release of the pressing-in force subsequent to fixedly securing the bearings.

By this method, the fork arms at the beginning of the pressing in operation press toward the center of the universal joint and only then will the reaction force support means, i.e., holding clips, become active and receive the reaction force resulting during the pressing-in operation. Depending upon the amount of force with which the fork arms are pressed toward the center of the universal joint, the bending of the fork arms away from the center of the universal joint as discussed above can be completely compensated for or free play (measured in an axial bore direction), between the spider trunnion and bearing can be obtained.

The method of the invention may be carried out with an apparatus in which the holding means for supporting the reaction force are connected to the device producing the pressing-in force in such a manner that it is displaceable, with respect to the device, toward the universal joint center by a predetermined amount whereby the holding means are pressed in a direction opposite to the pressing-in direction into its final position by means of a spring element whose spring force is weaker than the reaction force which occurs during the pressing-in operation.

In another characteristic of the apparatus of the invention, the means producing the pressing-in force and the holding means slidably connected therewith are provided with elements forming a stop means to restrict the movement of the holding means in the direction toward the universal joint center and also the spring element acting on the holding means in a direction opposite to the pressing-in direction is mounted on the means producing the pressing-in force. Another characteristic of the said apparatus resides in that the members connected with the means producing the pressing-in force and/or connected to the holding means may be adjustable to obtain variable displaceability of the holding means.

Referring to the drawings:

FIG. 1 is a partial cross-sectional view of an apparatus for the accomplishment of the method of the invention just before the processing-in operation.

FIG. 2 is a partial cross-sectional view of the apparatus of FIG. 1 during the pressing-in operation.

In the figures, shaft 1 is provided at its ends with two fork arms 2 having bores 3 into each of which extend a jointly aligned trunnion 4 of the universal joint spider 5. The trunnions of the universal joint spider 5 are arranged in axially and radially loadable bearings 6, which are pressed into the bores 3 of the fork arms 2. The other two jointly aligned trunnions of the universal joint spider 5 extend into the bores in the fork arms of a second shaft, where they are also accommodated in radially and axially loadable bearings. This second shaft is not shown in the drawing.

The apparatus supporting means 7, which simultaneously contains the centering device for the shaft 1 (not shown) supports the device 8 which produces a force to press the bearings 6 in the fork arm bores 3. The device 8 comprises a cylinder 9 and a piston 10 connected with a ram 11 for the pressing-in and/or the securing of the bearings 6. The cylinder 9 is operated by oil under pressure on both sides of the piston 10 which is supplied from the conduits 12, 13.

The fork arms 2 are in engagement with holding clips 14 which are connected to device 8 in such a manner that they are slidable, in opposite direction, toward the center of the universal joint. The holding clips 14 are moveably connected to another member 15 which member encloses by means of a collar 16 the extension member 17 of the device 8 producing the pressing-in force. The cylindrical member 17 has a collar 18 arranged on that side of the collar 16 which faces away from the device 8. A spring 21, abutting against the device 8, forces member 15 together with connected holding clips 14 opposite to the pressing-in direction against the collar 18 of the cylindrical member 17. Adjacent to collar 18, the member 15 has a threaded bore 19 in which a threaded nut 20 is secured.

FIG. 1 shows the device at the start of the pressing-in operation. Holding clip 14 engages fork arm 2 while spring 21 forces holding clip 14 through member 15 opposite to the pressing-in direction against the collar 18. The threaded nut 20 is screwed into the bore 19 in such a way that a certain distance is maintained between the nut 20 and the collar 18.

FIG. 2 shows the device after the bearing 6 has already been partly pressed into the bore 3 of the fork arm. Upon the pressing-in of the bearing 6, the fork arm 2 has been forced to a certain degree toward the center of the universal joint. This is possible in that holding clip 14 together with member 15 can give way the said distance toward the center of the universal joint by overcoming the force of the spring 21, which corresponds with the distance between nut 20 and collar 18 prior to the pressing-in operation.

By pressing aside one fork arm to a predetermined extent, the bearing is not pressed into the fork arm bore as deep as would be the case if a shifting of the fork arm could not be achieved. After removing the pressing-in force and the holding clips, the fork arm, together with the bearing pressed into the fork arm bore, springs back to the same extent as the fork arm had to be forced toward the center of the universal joint which results in free play between the base of the bearing and the corresponding contact surface of the spider trunnion.

It is also possible to select the extent of the yielding of the fork arm in such a manner that a zero-play develops between the bearing base and the corresponding contact surface of the spider trunnion after the pressing-in force and the holding clips have been removed.

In the embodiment of the drawings, the device for producing the pressing-in force is securely connected to the base 7 of the apparatus. But it is also possible to mount the device in the apparatus base in such a manner that it is movable in axial direction of the fork arms. By this means, variances in the fork arm thickness can be equalized in a simple manner. While in the illustrated embodiment, either the fork arms must have an equalization means for equalization of such variances or a portion of the distance by which the holding clips can give way may be used, in the case of a movably journaled device to equalize these variances; this may be displaced in such a manner until the holding clips abut without play against the fork arms. In this embodiment type, however, it is necessary to arrest the mobility of the device by suitable means during the pressing-in operation.

Various modifications of the method and apparatus of the invention may be made without departing from the spirit or scope thereof and it is to be understood that the invention is to be limited only as defined in the appended claims.

I claim:

1. A method of assembling universal joints formed by the connection of two shafts forked at their ends with a universal joint spider and having radially and axially loadable bearings for accommodating the spider trunnions in bores in the shaft forks which comprises centering the spider and the shaft forks relative to one another and pressing bearings into the bores of the fork arms while supporting the reaction force resulting from the pressing-in force at the fork arms, the said fork arms and reaction force support elastically giving way a predetermined distance in the pressing-in direction whereby the fork arms spring back the same distance after release of the pressing-in force subsequent to fixedly securing the bearings.

2. An apparatus for assembling universal joints formed by the connection of two shafts forked at their ends with a universal joint spider and having radially and axially loadable bearings for accomodating the spider trunnions in bores in the shaft forks comprising means for centering the spider trunnions in the bores of the shaft forks, a ram means for pressing the bearings into the bores of the shaft forks connected to a pressure applying means to provide the pressing-in force, holding means to hold the shaft fork and for transmitting reaction forces between the pressure applying means and the forked shafts, the said holding means being connected to the pressure applying means so that the holding means is movable opposite to the pressure applying means a predetermined distance toward the universal joint center, and spring means pressing the holding means into its final position in a direction opposite to the pressing-in direction, the force of the spring means being less than the reaction force occurring during the pressing operation.

3. The apparatus of claim 2 wherein the holding means and pressure applying means are provided with a stop means to restrict the movement of the holding means in the direction toward the universal joint center and the spring means is mounted on the pressure applying means.

4. The apparatus of claim 2 wherein the holding means is connected to the pressure applying means so that the movement of the holding means toward the universal joint center may be varied.

References Cited

UNITED STATES PATENTS

| 2,737,706 | 3/1956 | Isaac et al. | |
| 3,008,226 | 11/1961 | Kellerman | 29—201 |
| 3,230,617 | 1/1966 | Spiess et al. | 29—434 |
| 3,237,291 | 3/1966 | Kelso | 29—257 |

THOMAS H. EAGER, *Primary Examiner.*

U.S. Cl. X.R.

29—149.5, 201, 257, 434